United States Patent
Fowler et al.

(10) Patent No.: US 8,643,980 B1
(45) Date of Patent: Feb. 4, 2014

(54) MICRO-ACTUATOR ENABLING SINGLE DIRECTION MOTION OF A MAGNETIC DISK DRIVE HEAD

(75) Inventors: David E. Fowler, San Jose, CA (US); Mark R. Bragen, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 847 days.

(21) Appl. No.: 12/335,199

(22) Filed: Dec. 15, 2008

(51) Int. Cl.
*G11B 5/60* (2006.01)

(52) U.S. Cl.
USPC ...................................... 360/234.3

(58) Field of Classification Search
USPC ...................................... 360/234.3
See application file for complete search history.

(56) References Cited

U.S. PATENT DOCUMENTS

| | | | |
|---|---|---|---|
| 4,845,399 A | 7/1989 | Yasuda et al. | |
| 5,305,507 A | 4/1994 | Dvorsky et al. | |
| 5,703,425 A | 12/1997 | Feral et al. | |
| 5,894,651 A | 4/1999 | Dvorsky et al. | |
| 5,920,145 A | 7/1999 | Wu et al. | |
| 5,920,978 A | 7/1999 | Koshikawa et al. | |
| 5,929,497 A | 7/1999 | Chavan et al. | |
| 6,052,879 A | 4/2000 | Wu et al. | |
| 6,109,113 A | 8/2000 | Chavan et al. | |
| 6,136,212 A | 10/2000 | Mastrangelo et al. | |
| 6,140,144 A | 10/2000 | Najafi et al. | |
| 6,291,930 B1 | 9/2001 | Sager | |
| 6,393,681 B1 | 5/2002 | Summers | |
| 6,487,045 B1 | 11/2002 | Yanagisawa | |
| 6,513,382 B2 | 2/2003 | Tanaka et al. | |
| 6,570,730 B1 | 5/2003 | Lewis et al. | |
| 6,617,762 B2 | 9/2003 | Kurano et al. | |
| 6,639,761 B1 | 10/2003 | Boutaghou et al. | |
| 6,661,084 B1 | 12/2003 | Peterson et al. | |
| 6,661,618 B2 | 12/2003 | Fujiwara et al. | |
| 6,661,619 B2 | 12/2003 | Nishida et al. | |
| 6,703,767 B1 | 3/2004 | Summers | |
| 6,757,140 B1 | 6/2004 | Hawwa | |
| 6,807,030 B1 | 10/2004 | Hawwa et al. | |
| 6,870,709 B2 | 3/2005 | Shimanouchi et al. | |
| 6,883,215 B2 | 4/2005 | Takeuchi et al. | |
| 6,928,722 B2 * | 8/2005 | Yanagisawa | 29/603.07 |

(Continued)

FOREIGN PATENT DOCUMENTS

JP 63060617 A 3/1988

OTHER PUBLICATIONS

Monk, David J., et al., "Media Compatible Packaging and Environmental Testing of Barrier Coating Encapsulated Silicon Pressure Sensors", Solid-State Sensor and Actuator Workshop, Hilton Head, South Carolina, Jun. 2-6, pp. 36-41, 1996.

(Continued)

*Primary Examiner* — David D Davis (57) ABSTRACT

A magnetic recording device comprises a slider body having a slider interface surface and a magnetic transducer having a lower surface coplanar with an air bearing surface of the magnetic recording device. The magnetic transducer has a transducer interface surface perpendicular to the air bearing surface The magnetic recording device further comprises a piezoelectric actuator operably connecting the slider interface surface and the transducer interface surface. The piezoelectric actuator is configured to translate the magnetic transducer with respect to the slider body in a direction substantially parallel to the slider and transducer interface surfaces. The piezoelectric actuator comprises a plurality of elongate flexures disposed in parallel planes within a body of the piezoelectric actuator.

14 Claims, 5 Drawing Sheets

(56) References Cited

U.S. PATENT DOCUMENTS

| | | | |
|---|---|---|---|
| 7,082,671 B2 * | 8/2006 | Yanagisawa | 29/603.12 |
| 7,151,650 B2 | 12/2006 | Lee | |
| 7,152,290 B2 | 12/2006 | Junhua et al. | |
| 7,280,319 B1 | 10/2007 | McNab | |
| 7,352,538 B2 | 4/2008 | Kurihara et al. | |
| 7,420,785 B2 | 9/2008 | Yamazaki et al. | |
| 2002/0075605 A1 | 6/2002 | Nishida et al. | |
| 2002/0080532 A1 | 6/2002 | Fujiwara et al. | |
| 2002/0191342 A1 * | 12/2002 | Yanagisawa | 360/236.5 |
| 2003/0223154 A1 | 12/2003 | Yao | |
| 2004/0070885 A1 | 4/2004 | Kikkawa et al. | |
| 2004/0095686 A1 | 5/2004 | Kuwajima et al. | |
| 2004/0100736 A1 | 5/2004 | Kuwajima et al. | |
| 2004/0130831 A1 | 7/2004 | Kuwajima et al. | |
| 2004/0190175 A1 | 9/2004 | Chey et al. | |
| 2004/0201925 A1 | 10/2004 | Huha et al. | |
| 2004/0201926 A1 | 10/2004 | Hancer et al. | |
| 2007/0291419 A1 | 12/2007 | Lee et al. | |
| 2008/0024933 A1 | 1/2008 | Yao et al. | |
| 2008/0198511 A1 | 8/2008 | Hirano et al. | |

OTHER PUBLICATIONS

Monk, David J., "Thin Film Organic Passivation Coatings for Media Compatible Pressure Sensors", Motorola Inc. Technical Developments, pp. 29-30, Jul. 1995.

Bitko, Gordon, "Annealing Thin Film Parylene Coatings for Media Compatible Pressure Sensors", Motorola Inc. Technical Developments, pp. 92-94, Aug. 1996.

* cited by examiner

Figure 1

Prior Art

MICRO-ACTUATOR ENABLING SINGLE DIRECTION MOTION OF A MAGNETIC DISK DRIVE HEAD

FIELD OF THE INVENTION

The present invention generally relates to disk drives and, in particular, relates to a micro-actuator enabling single direction motion of a magnetic disk drive head.

BACKGROUND OF THE INVENTION

Figure 1:
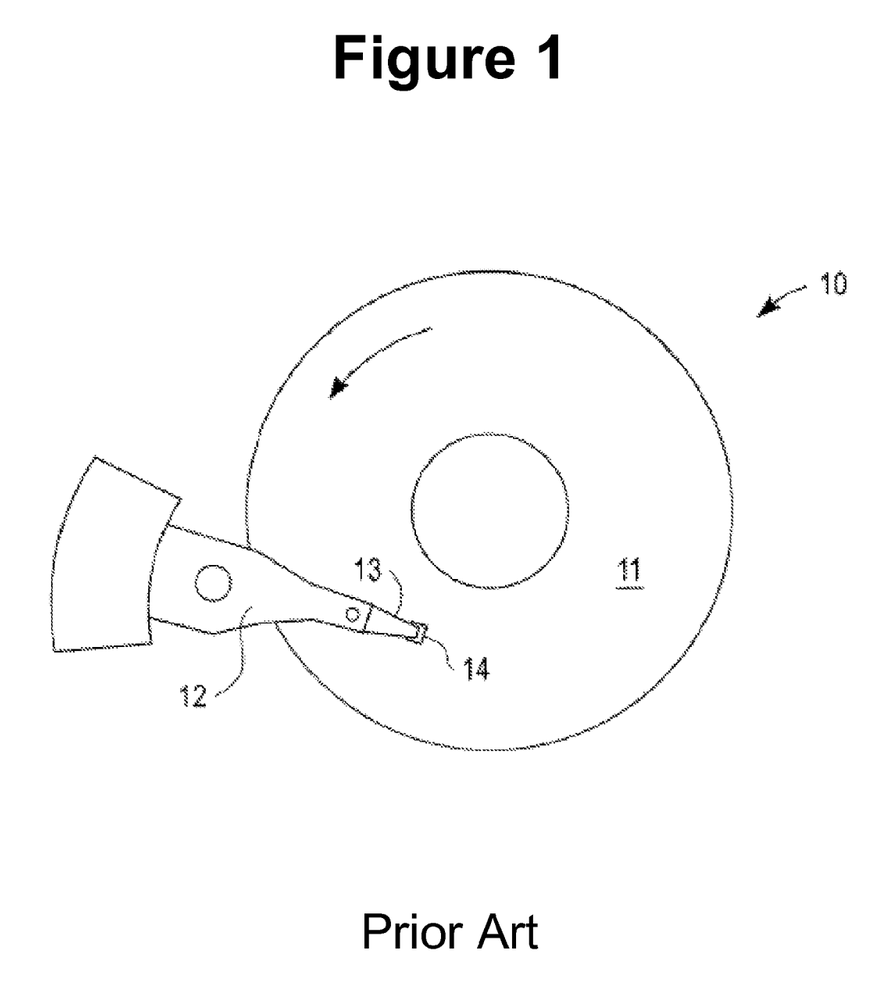
FIG. 1 illustrates a partial view of a hard disk drive including a track seeking/track following actuator with an attached head gimbal assembly in accordance with one aspect of the subject disclosure.

A hard disk drive includes a head disk assembly and a printed circuit board attached to a disk drive base of the head disk assembly. Referring now to FIG. 1, the head disk assembly 10 includes at least one disk 11 (such as a magnetic disk, magneto-optical disk, or optical disk), and a track seeking/track following actuator 12, and at least one head gimbal assembly HGA that includes a head 14 and a suspension assembly 13. During operation of the disk drive, the track seeking/track following actuator 12 must rotate to position the head 14 adjacent desired information tracks on the disk 11. An arrow on disk 11 indicates the direction of disk rotation in FIG. 1. Track seeking/track following actuator 12 may be a rotary actuator driven by a voice coil motor. The disk 11 includes an information storage media, such as, for example, a hard magnetic layer protected by a thin overcoat layer and supported by a substrate and various underlayers.

The head 14 comprises a body called a "slider" that carries a magnetic transducer on its trailing end. The magnetic transducer comprises a writer and a read element. The writer may be of a longitudinal or perpendicular design, and the read element may be inductive or magnetoresistive. The transducer is supported in close proximity to the magnetic disk by a hydrodynamic air bearing. As the motor rotates the magnetic disk, the hydrodynamic air bearing is formed between an air bearing surface of the head and a surface of the magnetic disk.

As the information storage capacities of hard drives are increased, the information tracks thereon become more closely spaced. Accordingly, accurate positioning of the transducer with respect to the information tracks becomes increasingly important to ensure accurate reading and writing of the data stored in the information tracks.

SUMMARY OF THE INVENTION

Various embodiments of the present invention solve the foregoing problem by providing a micro-actuator for laterally translating the transducer with respect to the slider body. The micro-actuator includes a plurality of elongate flexures configured to constrain the movement of the transducer to a single dimension, and to thereby improve the hard drive head's track following bandwidth by as much as, if not more than, 5 dB.

According to one embodiment of the subject disclosure, a magnetic recording device comprises a slider body having a slider interface surface, and a magnetic transducer having a lower surface coplanar with an air bearing surface of the magnetic recording device. The magnetic transducer has a transducer interface surface perpendicular to the air bearing surface. The magnetic recording device further comprises a piezoelectric actuator operably connecting the slider interface surface and the transducer interface surface. The piezoelectric actuator is configured to translate the magnetic head with respect to the slider body in a direction substantially parallel to the slider and transducer interface surfaces. The piezoelectric actuator comprises a plurality of elongate flexures disposed in parallel planes within a body of the piezoelectric actuator.

According to another embodiment of the subject disclosure, a method for making a piezoelectric actuator comprises the steps of disposing a layer of piezoelectric material over a substrate, forming a plurality of parallel trenches in the layer of piezoelectric material, plating an elongate flexure in each of the plurality of parallel trenches, and applying an electric field across the piezoelectric material in a direction substantially perpendicular to the plurality of elongate flexures to pole the piezoelectric material.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 2:
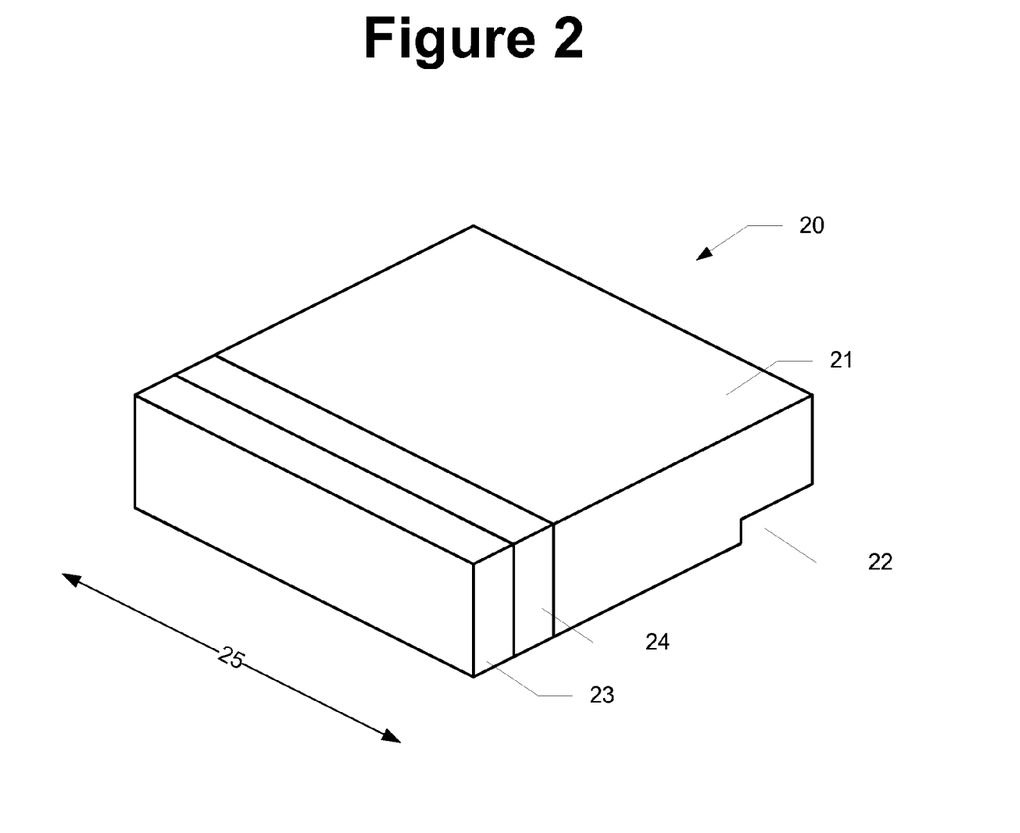
FIG. 2 illustrates a perspective view of a hard drive head including a slider body and a transducer operably connected by a micro-actuator in accordance with one aspect of the subject disclosure.

FIG. 2 illustrates a perspective view of a hard drive head in accordance with one aspect of the subject disclosure. Head 20 includes a slider body 21 with a leading edge 22, and a transducer 23 operably connected to slider body 21 by a micro-actuator 24. The lower surfaces of slider body 21, transducer 23 and micro-actuator 24 together form an air bearing surface of head 20, which forms a hydrodynamic air bearing when the disk drive in which head 20 is disposed is operated. As can be seen with reference to FIG. 2, micro-actuator 24 includes two major surfaces coupled to parallel interface surfaces of slider body 21 and transducer 23, respectively. According to one aspect of the subject disclosure, micro-actuator 24 is a shear-mode piezoelectric actuator configured to translate transducer 23 in a single dimension (along axis 25) with respect to slider body 21.

Figure 3:
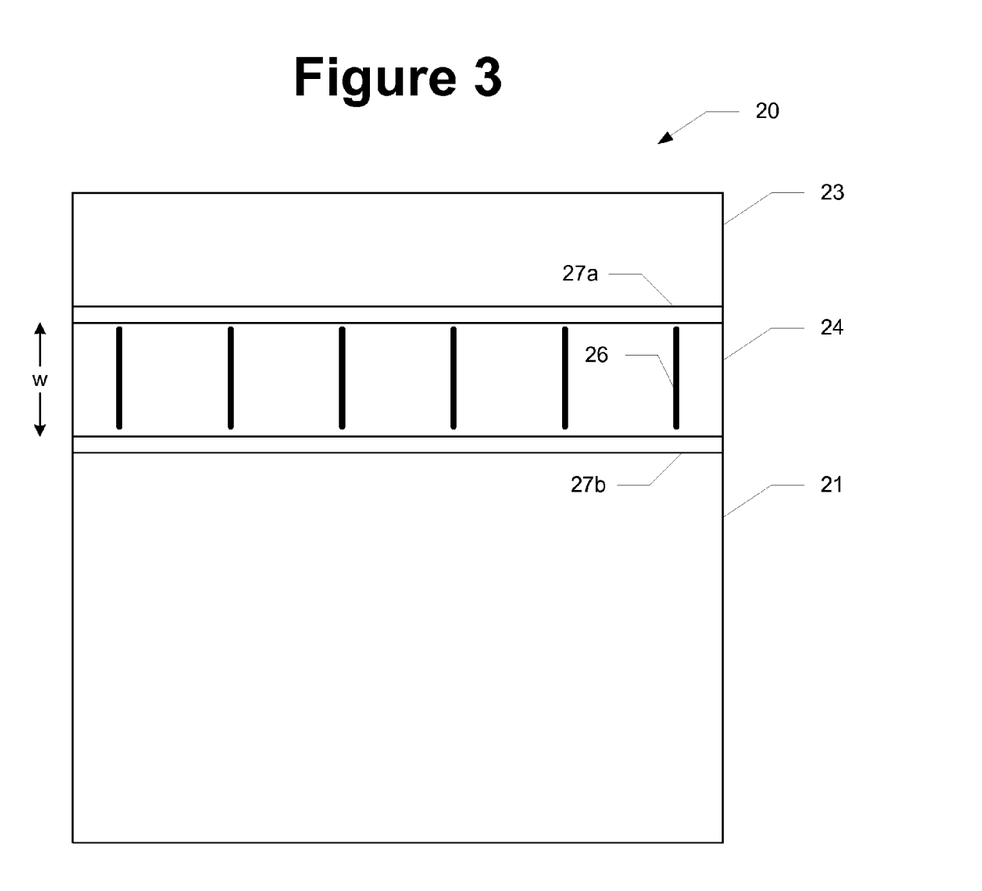
FIG. 3 illustrates a view from the air bearing surface of a hard drive head in accordance with one aspect of the subject disclosure.

Turning to FIG. 3, head 20 is illustrated from the perspective of the air bearing surface in accordance with one aspect of the subject disclosure. As can be seen with reference to FIG. 3, micro-actuator 24 includes a number of elongate flexures 26 disposed in the body thereof. The elongate flexures 26 constrain the motion of transducer 23 to a single dimension perpendicular to the information tracks in the disk over which head 20 is positioned, during operation of the hard disk drive in which head 20 is disposed.

According to one aspect of the subject disclosure, micro-actuator 24 is a piezoelectric actuator composed of a poled lead zirconate titanate (PZT) body, in which elongate flexures 26 are disposed. Micro-actuator 24 extends a width w between slider body 21 and transducer 23. According to one aspect of the subject disclosure, elongate flexures 26 extend substantially through the entire body of micro-actuator 24, such that each elongate flexure has a width approximately equal to w. On opposite sides of the body of micro-actuator 24 are disposed electrically conductive contacts 27a and 27b. By applying a voltage differential across electrically conductive contacts 27a and 27b, the poled body of micro-actuator 24 undergoes a shear stress that translates transducer 23 with respect to slider body 21. As very high voltages correspond to only tiny shear stress in the body of micro-actuator 24, the position of transducer 23 can be changed (e.g., over a ±50 nm range of travel) with very high precision.

While micro-actuator 24 has been described above as having a body composed of a PZT material, the scope of the present invention is not limited to this arrangement. Rather, as will be apparent to one of skill in the art with reference to this disclosure, the present invention has application to micro-actuators composed of any one of a number of piezoelectric materials.

In accordance with one aspect of the subject disclosure, because flexures 26 are elongate in shape (e.g., having a width and height substantially larger than the thickness thereof), they provide resistance to deformation of the micro-actuator 24 in directions other than the desired shearing direction. Piezoelectric materials normally respond to applied voltages by deforming in more than one dimension. According to one aspect of the subject disclosure, elongate flexures 26 constrain the motion of the piezoelectric material to a single (shearing) direction.

According to one exemplary aspect of the subject disclosure, elongate flexures may each be about 20 μm thick. Elongate flexures 26 may be formed from any one of a number of suitable materials, including metals, conductive amorphous silicon, amorphous silicon, conductive poly-silicon or poly-silicon. According to one aspect of the subject disclosure, elongate flexures 26 may comprise nickel, iron, or a nickel-iron alloy, to facilitate poling of the PZT material of the body of micro-actuator 24 during the manufacture thereof, as is set forth in greater detail below. According to another aspect, however, elongate flexures 26 need not be electrically conductive to constrain the shearing motion of micro-actuator 24 to a single dimension, and accordingly may be made of a non-conductive material.

Elongate flexures 26 may be substantially evenly spaced within the body of micro-actuator 24, with a distance between adjacent elongate flexures 26 being approximately equal to the width w of micro-actuator 24, in accordance with one aspect of the subject disclosure. Such an arrangement may further facilitate the poling of the PZT material of the body of micro-actuator 24 during the manufacture thereof, as is set forth in greater detail below. In a micro-actuator which does not rely upon the elongate flexures in the poling of the piezoelectric material thereof, however, the spacing of the elongate flexures need not be uniform, nor approximately equal to the width of the piezoelectric material. Rather, as would be readily understood by one of requisite skill in the art, the elongate flexures could be irregularly spaced, and could be spaced apart less than or greater than a distance equal to a width of the piezoelectric material. In this regard, it should be noted that FIG. 3 is a simplified view of head 20, which is not drawn to scale, but rather includes exaggerated features adapted to more clearly illustrate various aspects of the subject disclosure.

While the micro-actuator 24 of FIG. 3 has been illustrated as including six elongate flexures 26 disposed in the body thereof, the scope of the present invention is not limited to such an arrangement. Rather, as will be readily apparent to one of requisite skill in the art, a micro-actuator may include nearly any number of elongate flexures.

Figure 4:
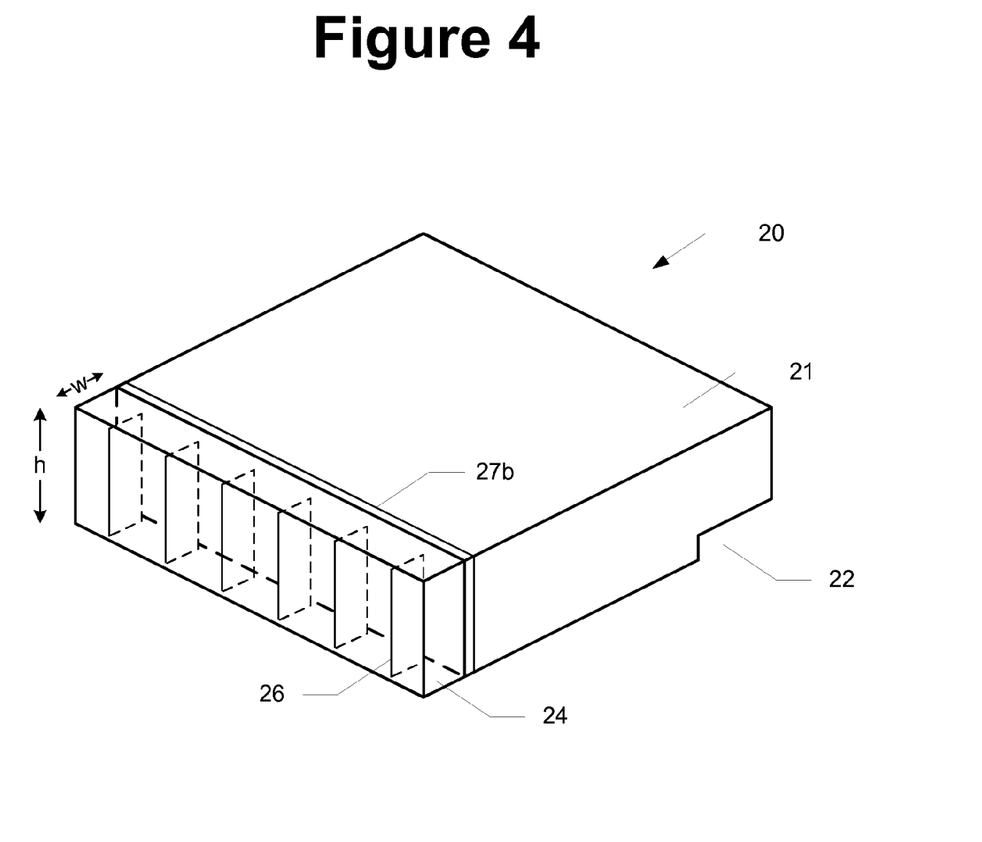
FIG. 4 illustrates a partial cut-away view of a hard drive head in accordance with one aspect of the subject disclosure.

FIG. 4 illustrates a partial cut-away view of hard drive head 20 in accordance with one aspect of the subject disclosure. As can be seen with reference to FIG. 4, elongate flexures 26 are disposed in parallel planes which are perpendicular to the air bearing surface of head 20. Moreover, micro-actuator 24 extends a height h in a direction perpendicular to the air bearing surface, and each elongate flexure has a height approximately equal to h. Such an arrangement may facilitate constraining the translation of transducer 23 to a single dimension, as no portion of the piezoelectric material of micro-actuator 24 is without the support of elongate flexures 26. In an alternative embodiment, however, elongate flexures with height and width substantially less than that of the piezoelectric material of micro-actuator 24 may also be provided.

Figure 5:
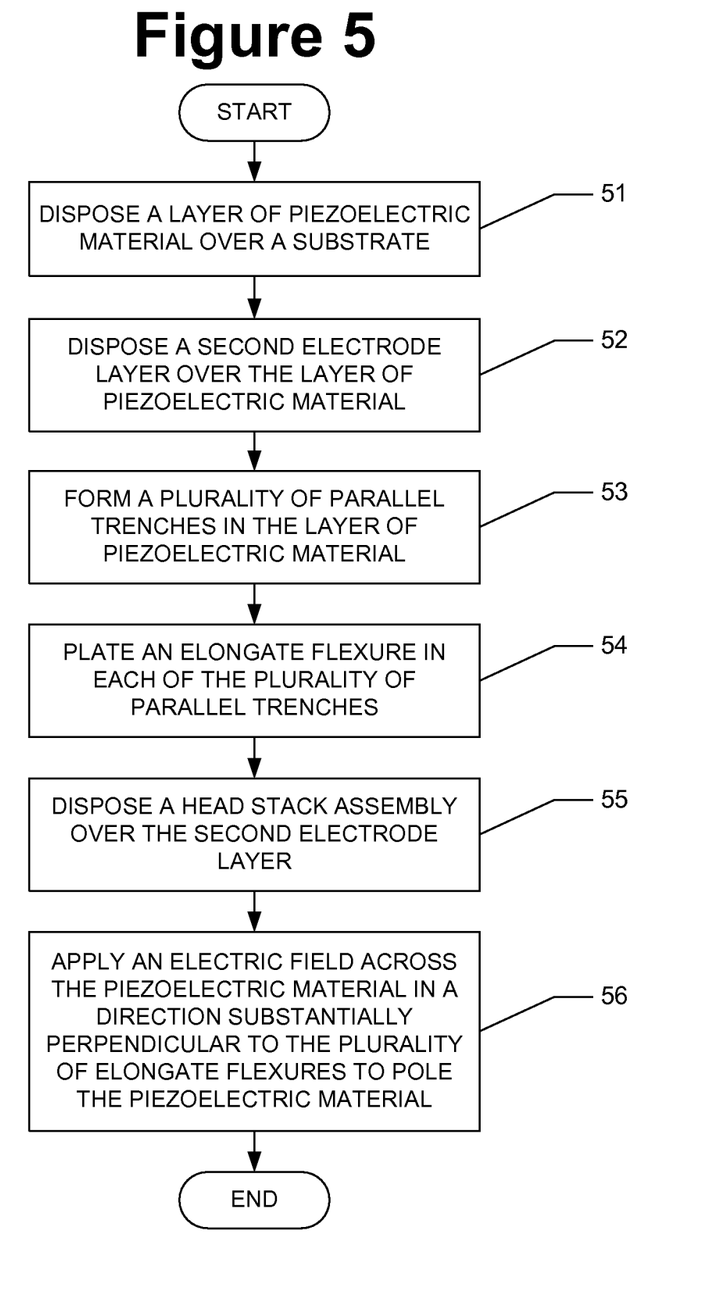
FIG. 5 is a flow chart illustrating a method for making a piezoelectric actuator in accordance with one aspect of the subject disclosure.

Turning to FIG. 5, a flowchart illustrating a method for making a piezoelectric actuator is illustrated in accordance with one aspect of the subject disclosure. The method begins with step 51, in which a layer of piezoelectric material is disposed over a substrate. In one embodiment, the substrate is a first electrode layer (e.g., of platinum, or some other electrically conductive material) disposed over a slider body of a magnetic recording device, such as electrode 27b and slider body 21 illustrated in greater detail above.

According to one aspect of the subject disclosure, the layer of piezoelectric material may be provided over the substrate by sol-gel deposition of the piezoelectric material (e.g., PZT) over the substrate. Alternatively, in another aspect, the layer of piezoelectric material may be provided over the substrate by bonding a wafer of the piezoelectric material to the substrate. Other methods for providing a layer of piezoelectric material over a substrate will be readily apparent to those of requisite skill in the art, and are not listed herein. After disposing the layer of piezoelectric material over the substrate, the piezoelectric material may be ground to a desired thickness using any one of a number of techniques known to those of skill in the art, including, for example, chemical mechanical polishing (CMP) or the like.

In step 52, a second electrode layer (e.g., of platinum or the like) is disposed over the layer of piezoelectric material. In step 53, parallel trenches are formed in the layer of piezoelectric material by deep reactive-ion etching. Other methods for forming trenches in the layer of piezoelectric material may also be used, such as, for example, ion milling, wet etching, or the like. According to one embodiment, each of the parallel trenches are formed to a depth approximately equal to a depth of the layer of the piezoelectric material, and to a length approximately equal to a length of the layer of the piezoelectric material.

To open portions of the second electrode layer to facilitate forming trenches in the piezoelectric material below, a nickel mask may be used, as nickel enjoys a greater resistance to reactive ion etching than platinum. Accordingly, a photo-resist pattern may be provided over the top of the second electrode layer to define the regions in which parallel trenches will be formed. A layer of nickel may then be electroplated over the second electrode layer, in the regions where the photo-resist is absent. The remaining photo-resist can then be removed, leaving a nickel mask with openings exposing the material of the second electrode layer. A reactive ion etching step (utilizing, for example, $SF_6$ in the presence of oxygen) removes the exposed material of the second electrode layer. A subsequent step of deep reactive ion etching (utilizing, for example, $SF_6$ in the presence of oxygen) may then form the trenches in the piezoelectric material. A final reactive ion etching step may be used to remove the exposed material of the first electrode layer, thereby forming the trench through both electrode layers as well as the piezoelectric material.

Into each trench formed in step 53, an elongate flexure is plated in step 54. In accordance with one aspect of the subject disclosure, the plating may involve filling the corresponding trench with a sacrificial material (such as, for example, poly-silicon), and deep reactive-ion etching a substantially rectilinear opening in the sacrificial material. Into the substantially rectilinear opening, an electrically conductive material (such as, for example, nickel, iron or a nickel-iron alloy) is electroplated, and the remaining sacrificial material is etched out of the trench, leaving the electrically conductive elongate flexure surrounded by an air gap on either side. Alternatively, in other embodiments, the sacrificial material may be left surrounding each flexure, or another dielectric material may be provided in its place. In yet another embodiment, after the sacrificial material is etched away, a conformal layer of insulating material, such as, for example, $SiO_2$ may be provided to surround and insulate the flexures.

In step 55, a head stack assembly (e.g., including a transducer such as transducer 23 described in greater detail above) may be provided over the second electrode layer. At this point, the wafer-level processing of the piezoelectric actuator may be completed, and the wafer in which the piezoelectric actuator is disposed may be separated into slider bars. This facilitates the poling of the piezoelectric material in step 56, which may be challenging to complete at the wafer level.

To pole the piezoelectric material in step 56, an electric field is applied across the piezoelectric material in a direction substantially perpendicular to the plurality of elongate flexures. This may be accomplished by applying an electric field across the entire body of the piezoelectric actuator, along the length thereof. Alternatively, the poling may be done between adjacent ones of the elongate flexures, which, because the distance between adjacent flexures is substantially less than the total length of the piezoelectric actuator, will require a smaller electric field than poling the entire body of the piezoelectric actuator with only two electrodes would require. Utilizing a smaller electric field is desirable, given the proximity of the piezoelectric actuator to the head stack assembly, which includes one or more read and/or write heads that can be damaged by large electric fields. In this regard, the sensitive read and/or write heads in the head stack assembly may be shunted and/or shielded during the poling step 56 to prevent an electrostatic discharge from damaging the heads.

While in the foregoing exemplary embodiments, the first and second electrode layers have been described as comprising platinum, the scope of the present invention is not limited to this particular arrangement. Rather, as will be readily apparent to one of skill in the art, first and second electrode layers may comprise any one of a number of electrically conductive materials, including, for example, gold, copper, silver, alloys thereof, or the like.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A magnetic recording device, comprising:
a slider body having a slider interface surface;
a magnetic transducer having a lower surface coplanar with an air bearing surface of the magnetic recording device, and a transducer interface surface perpendicular to the air bearing surface; and
a piezoelectric actuator operably connecting the slider interface surface and the transducer interface surface, the piezoelectric actuator comprising electrically conductive contacts on opposite surfaces of the piezoelectric actuator adjacent to the slider and transducer interface surfaces and configured to translate the magnetic transducer with respect to the slider body in a direction substantially parallel to the slider and transducer interface surfaces, the piezoelectric actuator comprising a plurality of elongate flexures disposed in parallel planes within a body of the piezoelectric actuator extending between the slider and transducer interface surfaces, wherein the plurality of elongate flexures are configured to constrain the movement of the transducer to a single dimension.

2. The magnetic recording device of claim 1, wherein the parallel planes are perpendicular to the air bearing surface.

3. The magnetic recording device of claim 1, wherein the opposite sides of the body of the piezoelectric actuator are respectively coupled to the slider and transducer interface surfaces.

4. The magnetic recording device of claim 1, wherein the plurality of elongate flexures are substantially evenly spaced within the body of the piezoelectric actuator.

5. The magnetic recording device of claim 1, wherein a distance between adjacent ones of the plurality of elongate flexures is substantially equal to a width w of the piezoelectric actuator in a direction between the slider body and the magnetic transducer.

6. The magnetic recording device of claim 1, wherein the piezoelectric actuator is a shear-mode actuator.

7. The magnetic recording device of claim 1, wherein the body of the piezoelectric actuator comprises lead zirconate titanate (PZT).

8. The magnetic recording device of claim 1, wherein each of the plurality of elongate flexures comprises an electrically conductive material.

9. The magnetic recording device of claim 1, wherein each of the plurality of elongate flexures comprises a flexible material.

10. The magnetic recording device of claim 1, wherein each of the plurality of elongate flexures comprises one or more of the elements selected from the group consisting of nickel and iron.

11. The magnetic recording device of claim 1, wherein the piezoelectric actuator extends a width w between the slider body and the magnetic transducer, and wherein the plurality of elongate flexures each have a width approximately equal to width w.

12. The magnetic recording device of claim 1, wherein the piezoelectric actuator extends a height h in a direction perpendicular to the air bearing surface, and wherein the plurality of elongate flexures each have a height approximately equal to height h.

13. A magnetic disk drive comprising the magnetic recording device of claim 1.

14. The magnetic recording device of claim 1, wherein the plurality of elongate flexures are disposed in parallel planes perpendicular to the transducer interface surface.

* * * * *